Oct. 20, 1970 P. S. SUGINO 3,535,507
OPTICAL SYSTEM FOR PROJECTING A NONPLANAR SOURCE
Filed July 10, 1968
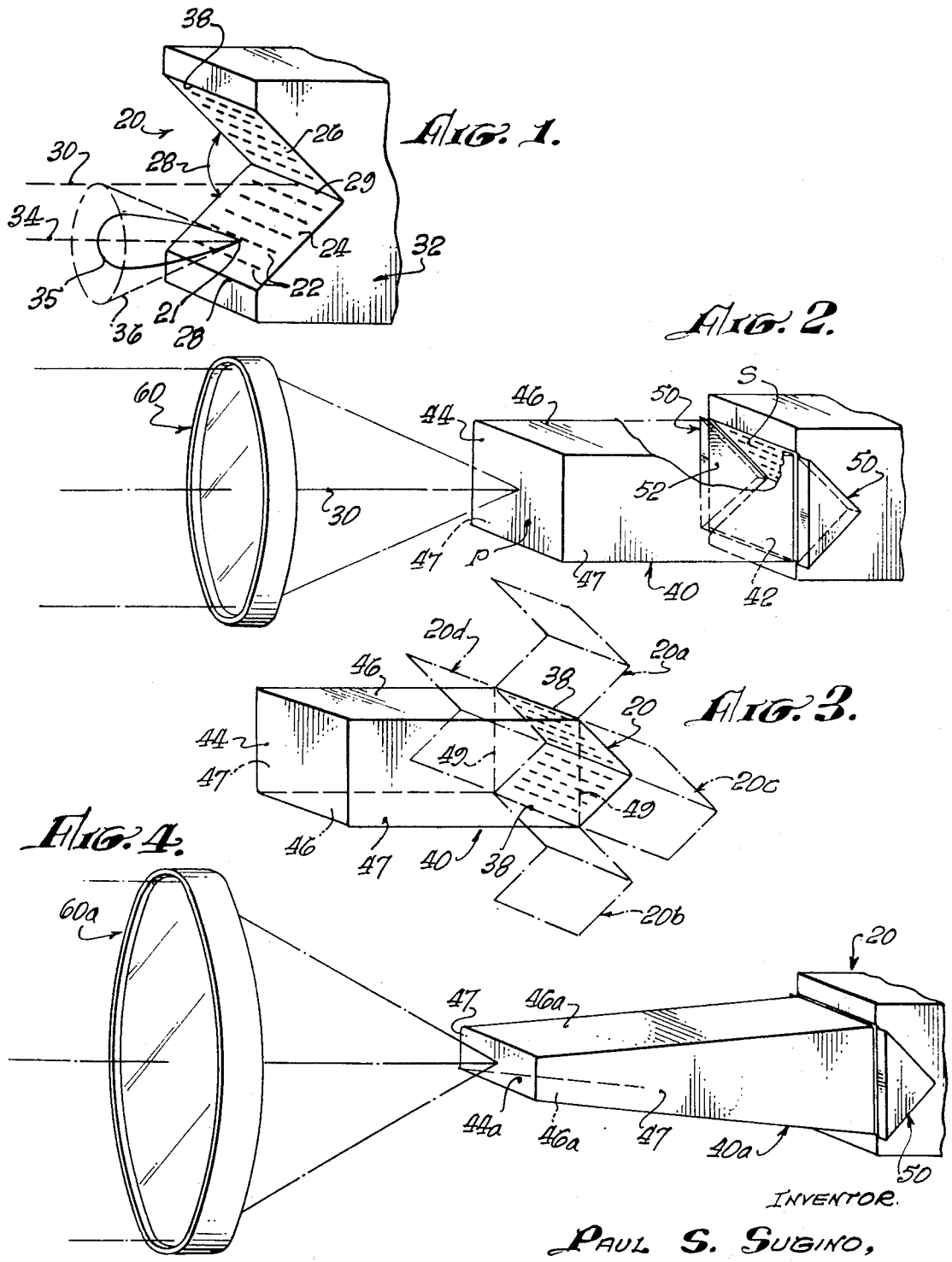
INVENTOR.
PAUL S. SUGINO,

United States Patent Office 3,535,507
Patented Oct. 20, 1970

3,535,507
OPTICAL SYSTEM FOR PROJECTING A NONPLANAR SOURCE
Paul S. Sugino, Santa Barbara, Calif., assignor to The Te Company, Santa Barbara, Calif., a corporation of California
Filed July 10, 1968, Ser. No. 743,855
Int. Cl. F21v 13/04
U.S. Cl. 240—41.3      5 Claims

ABSTRACT OF THE DISCLOSURE

A nonplanar array of discrete light sources is optically transformed to a planar and essentially uniform luminous surface having sharply defined boundaries by means of a solid optical duct with totally reflecting side walls and having at its entrance end reflective extensions complementary to the source array. The resulting luminous surface can be projected optically with good efficiency to illuminate uniformly a sharply defined region in object space.

---

This invention has to do with the projection of light from a nonplanar array of discrete, mutually spaced light sources to produce substantially uniform illumination of a sharply defined area in object space.

Such projection requires, on the one hand, good optical definition for sharply delineating the area that is illuminated, and, on the other hand, some means for avoiding the intensity variations that would normally result from sharp focussing of mutually spaced, discrete sources. Moreover, the axial extent of the array of sources to be projected greatly exceeds the depth of focus of any practical objective.

The invention is particularly useful for projecting light from an array of semiconductive diodes that are energizable to emit light with uniform distribution about respective aligned axes. For practical reasons such arrays, as commonly fabricated, are distributed on two surfaces that intersect to form a dihedral angle usually under 90 degrees, the light being emitted internally of the angle with all diodes aligned parallel to the axis that bisects the dihedral angle. If such an array is projected directly by a conventional objective lens it is not possible to illuminate uniformly a sharply defined area.

In accordance with the present invention, a nonplanar array of discrete sources, such as that just described, for example, is first optically converted to produce a substantially uniform flat luminous surface. That conversion is accomplished with high optical efficiency and with preservation of substantially the same directional characteristics of the original sources. The resulting luminous surface can then be projected by a conventional objective lens having sufficient resolution to give the desired boundary definition and having a suitable f/number to accept essentially the full light beam.

I have discovered that the described conversion from non-planar to effectively planar source can be accomplished by passing the light through an axially elongated optical duct comprising a body of optical material with totally reflecting side faces and flat entrance and exit faces perpendicular to the optical axis. The entrance face is preferably placed as close as possible to the source array and is shaped to conform generally to the lateral dimensions of the array. For sources of the type described arranged on rectangular surfaces forming a dihedral angle, the entrance face is preferably rectangular with opposite edges closely adjacent parallel side edges of the array. The side faces of the optical duct may be parallel to the optical axis, the cross-section of the duct then being uniform throughout its length. It is also feasible, however, to make the optical duct tapered in form with the exit face smaller than the entrance face in one or both dimensions. Such compression of the source dimensions is particularly useful when the area to be illuminated by projection has an aspect ratio different from that of the original source array. Analysis permits determination of optimum duct dimensions for various source parameters and output aspect ratios.

A full understanding of the invention and of its further objects and advantages will be had from the following description of certain illustrative manners in which it may be carried out. The particulars of that description, and of the accompanying drawings which form a part of it, are intended only as illustration and not as a limitation upon the scope of the invention, which is defined in the accompanying claims.

In the drawings:

FIG. 1 is a schematic perspective representing an illustrative source array of the type with which the invention is particularly concerned;

FIG. 2 is a schematic perspective representing an illustrative projection system in accordance with the invention;

FIG. 3 is a schematic perspective illustrating the optical behavior of the system of FIG. 2; and FIG. 4 is a schematic perspective representing a modification.

FIG. 1 represents schematically an illustrative non-planar or three-dimensional source of the type with which the present invention is particularly concerned. The present array 20 comprises a plurality of light emitting diodes 21 arranged in parallel rows 22 on two rectangular surfaces 24 and 26 which intersect in a common edge to form the dihedral angle 28 with vertex 29, all symmetrically disposed with respect to the main axis 30. Angle 28 typically is less than a right angle. The surfaces indicated at 24 and 26 are intended only as schematic representations of the array configuration, and not as actual support structures. Each diode is oriented in alignment with main axis 30, and the diode rows are typically mounted on respective ledges, not explicitly shown, which are parallel to vertex 29 and provide mounting surfaces perpendicular to axis 30. Since the source array 20 is not, in and of itself, a part of the present invention, the detailed structure and mode of operation of diodes 21 will not be described, and their supporting structure and operating mechanism are indicated only schematically at 32. All source elements 21 have substantially identical light distribution, typically represented in FIG. 1 by the envelope 35 bounded by the limiting cone 36 and displaying maximum intensity along the source axis 34 parallel to main axis 30. Cone 36 typically has a semiangle of the order of 15 degrees. An important aspect of the present invention has to do with preserving that angular light distribution or steradiancy common to the individual sources, and with utilization of essentially all the light within the limiting cones 36.

A source array of the type shown in FIG. 1 is difficult to project optically, as may be required, for example, to illuminate uniformly a sharply defined region in object space. If the objective lens is focussed, for example, on the plane defined by the two forward limiting edges 38 of the array, individual sources near dihedral angle vertex 29 are outside the depth of focus of any practicable lens capable of receiving the full emission from each source.

The nonplanar source array is optically converted, in accordance with the present invention to an essentially plane and sharply defined luminous surface that can be projected efficiently by a normal objective lens. That is typically accomplished by the optical elements shown schematically in FIG. 2. The optical duct 40 comprises a unitary block of optical material having plane rectangular entrance and exit faces 42 and 44 perpendicular to main axis 30. Duct 40 has optically flat top and bottom faces 46 and lateral faces 47, which provide totally reflecting surfaces for light internally incident at acute angles less than the critical angle. Duct 40 is mounted, by means not explicitly shown, coaxially of axis 30 and with its entrance face spacedly opposed to the source array and as close to the latter as conveniently possible. The vertical dimension of entrance face 42, as seen in FIG. 2, is preferably just sufficient to receive substantially the entire cone of light emitted from the limiting rows of the source array. The horizontal dimension of entrance face 42 slightly exceeds the length of the source rows. The space defined between entrance face 42 of duct 40 and the two surfaces forming dihedral angle 28 (FIG. 1) is free of optical material.

An important aspect of the invention, however, closes the ends of the space just described by optically reflective walls parallel to duct sidewalls 47 and hence perpendicular to the vertex 29 of dihedral angle 28. Those walls are typically formed by reflective coatings applied to the inner faces of the two flat triangular plates 50. Those plates are mounted, by means not explicitly shown, with their inner, reflective faces 52 essentially coplanar with the side surfaces 47 of solid duct 46. The slight space between those coplanar surfaces shown in FIG. 2 is exaggerated for clarity of illumination, but is preferably negligibly small. The triangular plates 50 project into the sources on surfaces 24 and 26 to intercept essentially all of the light emitted even from the sources at the ends of the source rows. Reflective plates 50 thus effectively form extensions of side walls 47 of duct 40, though the space between plates 50 is empty, while that between side walls 47 is uniformly filled with optical material.

Reflection of light from the source array by the side walls 46 and 47 of duct 40 tends to concentrate light at exit face 44. That face thus becomes effectively a luminous source of sharply defined dimensions. If the length of duct 40 is sufficient, the sidewall reflections tend to average out the non-uniformities due to the discrete nature of the sources of array 20, producing effectively uniform illumination at exit face 44. Moreover, the optical duct effectively eliminates differences in axial position of the various sources, essentially converting the non-planar configuration of sources 20 to the strictly planar form presented by exit face 44. Accordingly, that exit face of the duct can be projected by an objective lens of any desired optical quality aligned on main axis 30 with its focal surface at exit face 44 of the optical duct. Such a lens is represented at 60, arranged to project face 44 to a distant conjugate focal surface on axis 30.

For a duct of uniform section, as represented in FIG. 2, the numerical aperture of lens 60 that is required to accept the entire light cone 36 emitted by each source of array 20 is the same as if those same sources were distributed over the surface 44. Hence the system is inherently high efficient. With total reflection at duct sidewalls 46 and 47, with very slight reflection losses at the small mirror surfaces on plates 50, and with faces 42 and 44 of duct 40 suitably coated to reduce reflection losses, virtually all light emitted by the source array is delivered to lens 60. Absorption losses within duct 40 may be appreciable for light of certain wavelength regions for which perfectly transparent optical materials are not available, as is true for the infrared wavelengths emitted by some available diode sources. Under that condition it is important to limit the length of duct 40 to the minimum that will produce the required degree of uniformity at luminous exit face 44.

The optical action of the duct structure of FIG. 2 is illustrated schematically in FIG. 3. For clarity of description in connection with FIG. 3, the reflective faces of plates 50 will be considered to form extensions of the duct side walls 47, and they are so drawn, the structural separation being indicated only by the dotted lines 49.

Sidewalls 46 and 47 of the duct may be considered to enhance source array 20 by producing virtual images of that array which extend its effective dimensions both parallel and perpendicular to the array vertex. Reflection of array 20 in the upper duct face 46 produces the image indicated at 20a, while similar reflection in the lower duct face produces image 20b. Reflection in the side walls 47 produces images at 20c and 20d, which may be considered as extensions of the rows of sources of the main array 20. Also, the rows that make up virtual sources 20a and 20b are similarly extended by successive reflections in two adjacent duct side surfaces. All of those virtual sources may be considered to form with actual source 20 an enhanced three dimensional array of sources by which exit face 44 is directly illuminated.

Virtual source arrays 20a through 20d extend theoretically to infinity. However, the light emission from each individual virtual source is limited to a finite cone corresponding directly to cone 36 of FIG. 1. Hence only the virtual sources within a finite and relatively small region about actual source 20 emit light in a direction to reach exit face 44. The longer duct 40 is made, the larger the absolute size of that effective region of the virtual source array, and the more uniform is the resulting illumination of exit face 44, despite detailed non-uniformity and non-planar form of the array. Hence by increasing the duct length it is possible to obtain substantially any desired degree of uniformity of illumination of exit face 44.

In accordance with a further aspect of the present invention, it is possible to determine by computation the duct length required to produce a predetermined degree of uniformity in luminous face 44, and hence in the illumination projected by lens 60. For that purpose an analytical expression is derived representing the intensity at an arbitrary point P of face 44 due to a single source element S at an arbitrary point of the optically enhanced array. That expression takes account of the distance between S and P and also of the intensity of emission from S in the direction toward P, which can be expressed empirically in accordance with the known angular distribution from each source, indicated illustratively at 35 in FIG. 1. That analytical expression is then integrated along the length of the row containing S between limits that represent the extreme positions at which S emits any light in the direction toward P. The resulting analytical expression for intensity due to a row of sources is summed numerically over all rows in the optically enhanced source array from which any light can reach point P. That summation is carried out for any desired number of points P of exit face 44, permitting the relative intensity to be plotted as a function of position in face 44. By that procedure it has been determined that highly satisfactory uniformity of illumination over the exit face, typically within about 2%, is obtainable with a duct structure as shown in FIG. 2 if the duct length is between about one and two times the sum of the width of array 20 between edges 38 and the axial extent of the array, that is, the axial distance from vertex 29 to the plane of edges 38. At the lower limit of that range the uniformity is already satisfactory for most purposes, while at the stated upper limit there is normally little to be gained by further increasing the duct length.

A further aspect of the invention provides optical compression of one or both of the lateral dimensions of the source array, as to illuminate by projection an area having an aspect ratio different from that of the original array. That is accomplished by forming the optical duct with two opposite sidewalls oppositely oblique with respect to the main axis. As shown illustratively in FIG. 4, the upper and lower sidewalls 46a taper toward each other in a forward direction, the lateral sidewalls 47 being mutually parallel as in FIG. 2. The exit face 44a is thereby reduced in vertical dimension, while its horizontal dimension is unchanged. The exact duct proportions may be selected to produce any desired aspect ratio, within relatively wide limits set by practical considerations. The structure shown provides an aspect ratio approximating 3 to 1. With such compression the length of the optical duct must be somewhat increased to produce a given degree of uniformity of illumination, as compared to a symmetrical system such as that of FIG. 2. Also, the light emerging from exit face 44a corresponds to a smaller f/number in the coordinate in which the compression takes place. The relative aperture of the projection lens must be varied correspondingly if all light is to be utilized. That limitation is less severe the narrower the cone of emission of the individual sources.

I claim:

1. In combination with an array of discrete light sources distributed both radially and axially with respect to an axis and emitting light substantially confined to respective cones of predetermined semiangle with apices at the sources and extending therefrom in axial alignment in a forward direction;

opeical means for effectively flattening said array, comprising an axially symmetrical body of light transmitting optical material having plane parallel entrance and exit faces perpendicular to the optical axis, and having totally reflecting optical side faces, the entrance face opposing the sources adjacent the forward boundary of the array in position to intersect all the cones, the axial length of the body being such that light leaving the exit face is distributed substantially uniformly over the entire area thereof and the exit face is effectively a plane uniform source of forwardly directed light.

2. Optical means as defined in claim 1, and in which said sources are distributed substantially uniformly on two surfaces that intersect to form a dihedral angle, said optical axis bisecting the dihedral angle and the intersection of the surfaces, and said optical means includes two plane reflectors perpendicular to the vertex of the dihedral angle and substantially filling the space between said two surfaces and the entrance face of said body.

3. Optical means as defined in claim 1, and in which the axial length of said body is between about one and about two times the sum of the width of the entrance face and the axial length of the source array.

4. Optical projection apparatus for projecting light emitted by an array of discrete light sources distributed symmetrically with respect to an axis on two surfaces that intersect to form a dihedral angle less than a right angle, said sources emitting light substantially confined to respective cones of predetermined semiangle with apices at the sources and extending therefrom interiorly of the angle and parallel to the axis, said apparatus comprising in combination an axially symmetrical body of light transmitting optical material mounted coaxially and having plane parallel entrance and exit faces perpendicular to the axis and having totally reflecting side faces, the entrance face being opposedly spaced from the sources in position to intersect all the cones, and the exit face being spaced from the entrance face by at least about the sum of the width of the entrance face and the axial distance from the entrance face to the vertex of the dihedral angle, and an axially aligned objective lens receiving light from the exit face for imaging the same at a conjugate focal surface.

5. Optical projection apparatus as defined in claim 4, and including two plane reflectors perpendicular to the vertex of the dihedral angle and opposedly spaced on opposite sides of the array and substantially filling the space between the two said surfaces and the entrance face of the body.

References Cited
UNITED STATES PATENTS

| | | | |
|---|---|---|---|
| 2,692,952 | 10/1954 | Briggs | 350—96 |
| 3,033,071 | 5/1962 | Hicks | 350—96 |
| 3,302,016 | 1/1967 | Larraburu | 240—41.3 |

NORTON ANSHER, Primary Examiner

A. MATHEWS, Assistant Examiner

U.S. Cl. X.R.

240—93, 106; 350—96